(12) United States Patent
Karlsson et al.

(10) Patent No.: US 8,046,846 B2
(45) Date of Patent: Nov. 1, 2011

(54) HELMET RESTRAINT SYSTEM

(75) Inventors: Jimmie Karlsson, Linköping (SE);
Maria Martikkala, Luleå (SE)

(73) Assignee: SAAB AB, Linköping (SE)

( * ) Notice: Subject to any disclaimer, the term of this patent is extended or adjusted under 35 U.S.C. 154(b) by 1151 days.

(21) Appl. No.: 11/700,097

(22) Filed: Jan. 31, 2007

(65) Prior Publication Data

US 2011/0093999 A1    Apr. 28, 2011

(30) Foreign Application Priority Data

Jan. 31, 2006  (EP) ..................................... 06101090

(51) Int. Cl.
*A42B 7/00* (2006.01)
(52) U.S. Cl. ............................................... 2/421; 2/410
(58) Field of Classification Search ................. 2/61, 6.1,
2/6.2, 6.6, 411, 421, 422, 416, 425, 468,
2/44, 45, 2.14, 410, 5; 244/143; 602/17;
128/857, 845, 846
See application file for complete search history.

(56) References Cited

U.S. PATENT DOCUMENTS

| | | | |
|---|---|---|---|
| 3,157,885 A * | 11/1964 | Lobelle | 2/2.14 |
| 3,925,822 A * | 12/1975 | Sawyer | 2/421 |
| 5,259,833 A * | 11/1993 | Barnett | 602/19 |
| 5,272,770 A | 12/1993 | Allen et al. | |
| 5,437,613 A | 8/1995 | Reggio et al. | |
| 5,692,933 A * | 12/1997 | Bradley et al. | 441/106 |
| 6,006,700 A * | 12/1999 | Cox | 119/857 |
| 6,330,722 B1 | 12/2001 | Betts | |
| 6,810,535 B1 | 11/2004 | Moloney | |
| 2003/0146348 A1* | 8/2003 | Douglas et al. | 244/151 R |
| 2004/0055077 A1 | 3/2004 | Wright | |

OTHER PUBLICATIONS

European Search Report.

\* cited by examiner

*Primary Examiner* — Gary L Welch
*Assistant Examiner* — Andrew Collins
(74) *Attorney, Agent, or Firm* — Venable LLP; Eric J. Franklin

(57) ABSTRACT

A helmet restraint system for restraining the forward and downward movement of a helmet having an unfavorable center of gravity. A buckle strap having a first end and a second end is configured to be movably disposed in a wearer's garment. The buckle strap is preloaded between its first end, which is attached to the adjustment mechanism, and its second end, which is attached to an emergency release, and is extended in a loop coming out from first and second openings respectively in the collar of the garment for connection with a snap hook on the helmet.

10 Claims, 2 Drawing Sheets

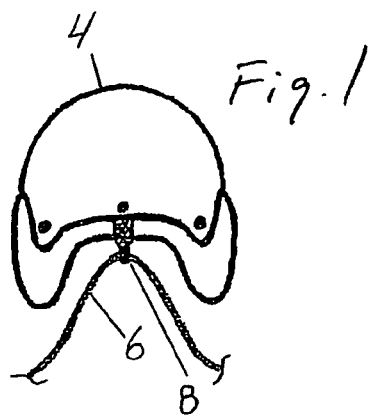
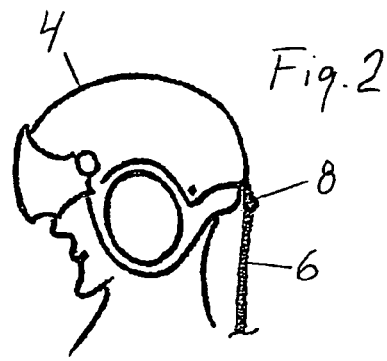
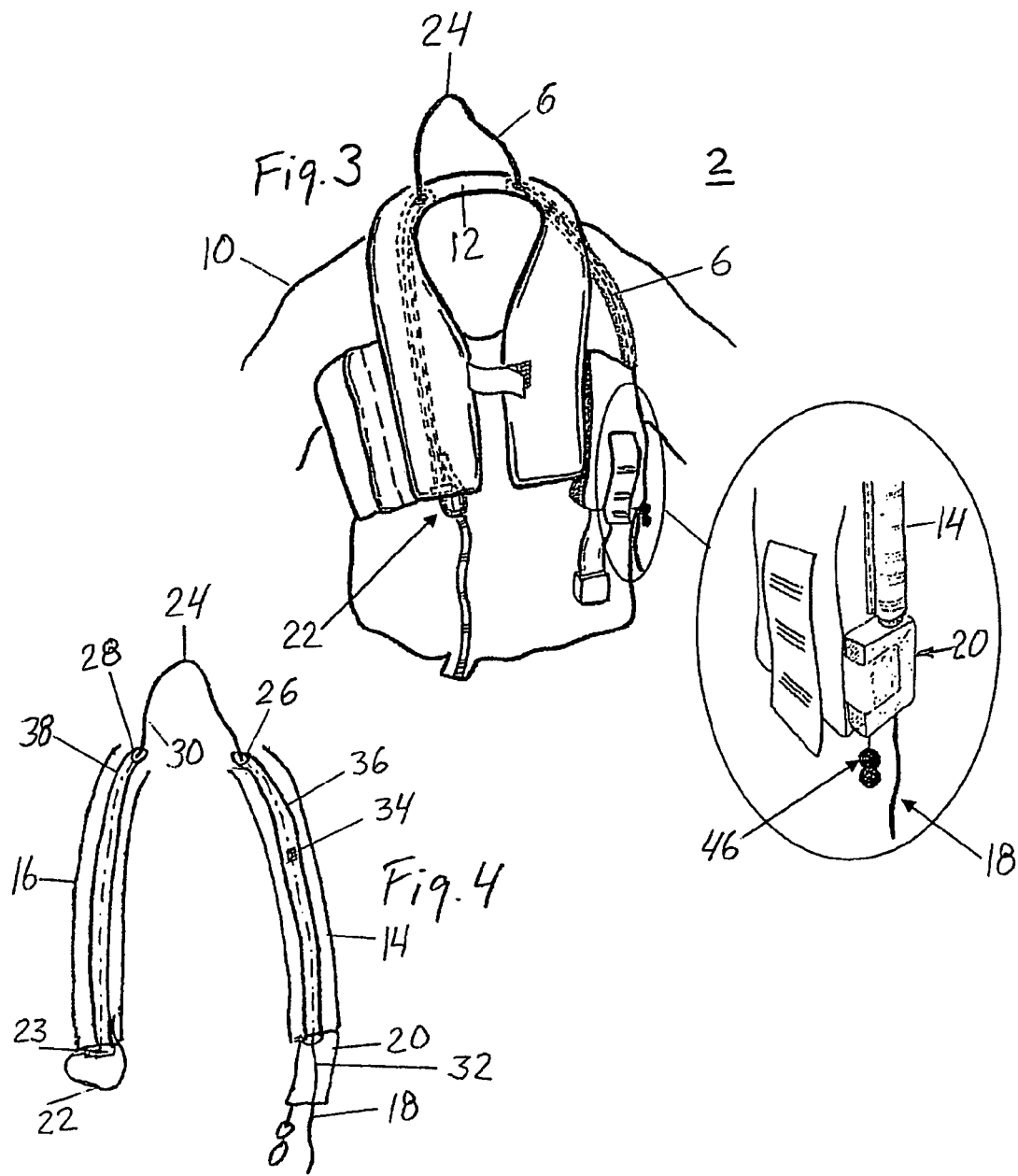

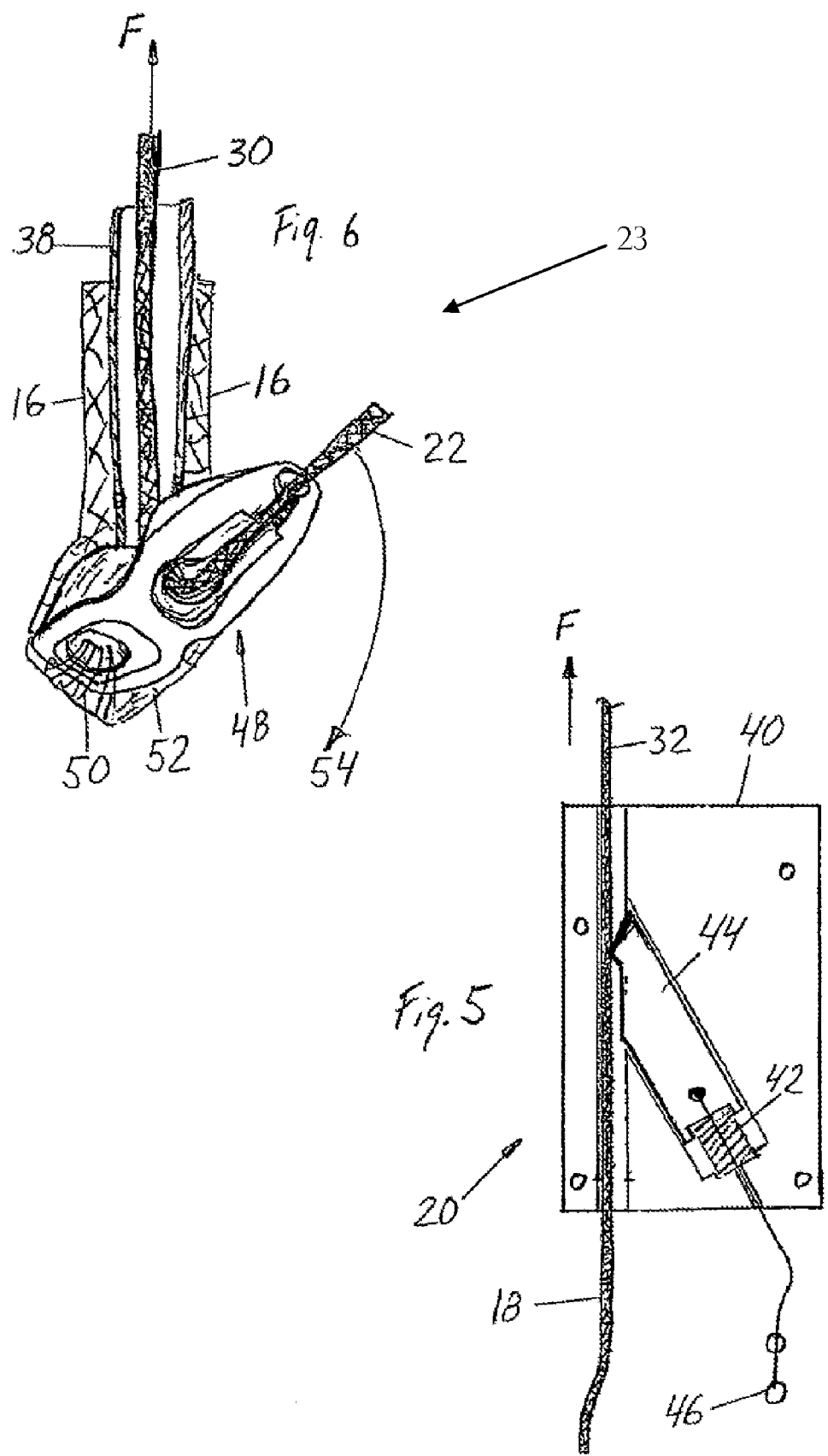

HELMET RESTRAINT SYSTEM

CROSS-REFERENCE TO RELATED APPLICATIONS

This application claims priority to European patent application 06101090.6 filed 31 Jan. 2006.

BACKGROUND OF THE INVENTION

1. Technical Field of the Invention

The present invention relates to a helmet restraint system for restraining the forward and downward movement of an occupant's helmet and head, in particular adapted for a heavy pilot helmet having an unfavorable centre of gravity, comprising a buckle strap having a first end and a second end, first attachment means engaged with said helmet and adapted for being associated with said buckle strap and second attachment means engaged with the buckle strap. More particularly, the invention relates to a system for operationally securing a helmet worn by a driver, pilot or occupant of a high-performance vehicle such as a race car, aircraft or boat, to the garment of e.g. said pilot.

Problem

Recently, in aircrafts and helicopters the use has increased of helmet mounted systems like Helmet Mounted Display (HMD), pilot helmets provided with Night Vision Goggles (NVG's) and heavy pilot helmets having an unfavorable/adverse centre of gravity. Therefore, helmets provided with HMD and NVG induce an increase in load forces to the muscles, tissues and ligaments of the pilots head and neck. It is well known that even helmets with a relatively well-arranged centre of gravity might cause neck injuries in conditions involving a heavy G-load combined with continuous use. It is expected that an adverse centre of gravity will result in an increasingly higher chance for neck injuries. Further, the specific design of a helmet in combination with the pilot's body-position, heavy G-load and -acceleration during flight and long lasting flights, would cause heavy load forces to the muscles and tissues of the pilots head and neck. In the HMD- and NVG-cases the center of gravity is located far forward and high up (forward high) in relation to an optimum centre of gravity. This will result in a high moment factor to the neck during flight, which must be compensated by neck muscle activity. A heavy weight combined with an adverse centre of gravity will also result in a high inertia moment which in turn might cause unpleasant rotational movements to the neck together with increased shearing strain in the spinal column. These elements all together would result in increased strain to muscles, spondyls, tissues and ligaments.

Observations related to complex neck problems of fighter pilots include among others fatigue of muscles and degenerative changes. Fatigue might result in decreased efficiency to the pilot with shortened flights and would most likely be aggravated by an unfavorable helmet design. Helmet mounted systems also increase the static load on the neck. It has been observed that static load during e.g. transport flights might accelerate the degenerative changes and it is believed that this phenomenon would be enlarged by an increase in weight and by an adverse centre of gravity. Information taken, degenerative changes might result in a chronic injury by elderly people meaning dehydration and crack formation of the vertebrae. Hence, it has been observed that fighter pilots get degenerative changes prematurely as a result of a continuous exposure to high G-loads.

2. Description of Related Art

Conventionally, for example NVG's are used in combination with counter weights in order to improve the centre of gravity location and enlarge the pilot's comfort. However, these measures are not optimal as, on the one hand, the back space is limited but firstly because of the unwillingness to add to the inertia factor. A rise in the inertia moment would cause enlarged rotational movements of the pilots head during maneuvers involving steep turns and/or aerobatics, which would result in unpleasant moment factors to the neck and increased muscle activity. Therefore, usually no external support is used to relieve the pressure on the pilot's neck, for example in jet fighters.

GB 564614 discloses a safety device for e.g. for pilots, intended to prevent dislocation of the neck on a sudden stop. Said safety device comprises an elongated frame secured to the pilot's back and having a rigid projection secured to the helmet by a strap of such length and elasticity as to prevent injurious forward jerk of the head. The frame may be incorporated in the pack of the parachute.

U.S. Pat. No. B1-6,810,535 discloses a helmet restraint device of the initially defined kind, which reduces potentially injurious forces to the occupant's head and neck during high-deceleration of a vehicle, particularly a frontal collision. A rod is disposed behind and below the occupant's neck, just beneath the shoulder harness and is connected with a strap that attaches between the occupant's helmet and said rod. Said strap is connected to the helmet via attachments in the helmet and a cable assembly, so as to allow the occupant's head to move freely from side to side. The strap elongates a controlled amount as the deceleration forces on the helmet, head and neck increase, thereby allowing for controlled restraint of the occupant's head and neck. The elongation rate of the strap might be tailored via the strap composition as to material, weave and density.

SUMMARY OF THE INVENTION

One principal object of the present invention is to provide a system for decreasing heavy load forces to the muscles, tissues and ligaments of the head and neck of an occupant of a high-performance vehicle. This is possible with a system of the initially identified kind, characterized in that the buckle strap is configured to be movably disposed in a pilot's garment and said second attachment means comprise a first fixing point at the left front side and a second fixing point at the right front side of said garment, the buckle strap being preloaded between its first end, which is attached to said first fixing point, and its second end, which is attached to said second fixing point, and extended in a loop coming out from first (left) and second(right) openings resp. in the collar of said garment for connection with said first attachment means.

In one embodiment the buckle strap is at least partially guided in hollow rigid members mounted in pack cloth channels extended between, on one side the first collar opening and first fixing point and on the other the second collar opening and second fixing point of the garment.

Advantageously, the first fixing point is configured with an adjustment mechanism arranged for adjusting the tension of the buckle strap at its first end and the second fixing point is configured with an emergency release arranged for releasable fixing of the buckle strap at its second end.

Further embodiments, improvements and developments of the device according to the invention appear from the following detailed description and the appended claims with refer-

BRIEF DESCRIPTION OF THE DRAWINGS

A helmet restraint system 2 is configured

FIG. 1 shows a helmet from behind associated with a buckle strap of the restraint system, FIG. 2 is a side view of said helmet located on a pilots head, FIG. 3 is a front view of a pilots garment equipped with the helmet restraint system, FIG. 4 shows the helmet restraint system of FIG. 3, the pilots garment omitted, FIG. 5 is a partially cut out side view of an adjustment mechanism of said system and FIG. 6 is a partially cut perspective view of a emergency release of the system.

DETAILED DESCRIPTION OF EMBODIMENTS OF THE INVENTION

A helmet restraint system 2 is configured for restraining the forward and downward movement of an occupant's helmet and head. Said restraint system is in particular adapted for a heavy pilot helmet 4 having an unfavorable centre of gravity, for example when provided with HMD and NVG. In FIGS. 1 and 2 the helmet 4 is shown associated with or hitched to a buckle strap 6 of the restraint system 2 by means of a first attachment means exemplified as a snap hook 8 permanently fastened to the central back part of the helmet 4.

FIG. 3 shows a front view of the restraint system integrated in a pilot's garment, e.g. a life vest, harness, a conventional flight jacket or an arm restraint jacket. In the illustrated embodiment the garment is a flight jacket 10 with a life vest having a buoyancy collar 12. The buckle strap 6 is configured to be movably disposed in pack cloth channels 14, 16 stitched to said flight jacket at the left front side and the right front side resp. of said jacket. A first end 18 of the buckle strap 6 is associated with an adjustment mechanism 20 as a first fixing point at the left front side of the jacket and the second end 22 is associated with an emergency release 23 as a second fixing point under its life vest at the right front side of the jacket. By means of said adjustment mechanism 20, which might be placed in a pocket fastened to the emergency radio pocket, the buckle strap 6 can be preloaded between its first end 18 and its second end 22 extended in a loop 24 coming out from a first 26 (left) and a second 28 (right) opening in the buoyancy collar of the jacket, said loop 24 being connected to said snap hook 8.

Advantageously, as best appear from FIG. 4, the buckle strap is partially made of elastic cord 30 and at least a part adjacent to its first end of inelastic cord 32. The elastic cord might be of a fairly elastic character suitable to generate an elastic resistance in the snap hook 8 tensed preferably within an interval of 10-300 N. For this purpose a regular shock absorber cord made of rubber would be preferred. The inelastic cord is preferably made of synthetic material like for instance spun yarn etc. capable to withstand a corresponding tension. The elastic 30 and inelastic 32 cords are interconnected by means of a seam 34, which means the cords might be stitched, melted or solded together.

In an advantageous embodiment, hollow rigid members, for example configured as a left 36 and right 38 tube of low friction plastic material as Teflon can be arranged in the resp. pack cloth channel 14, 16 between the first 26 and second 28 collar openings and the first 20 and second 23 fixing points respectively, for accommodating the buckle strap constituted of said elastic 30 and inelastic 32 cords. The ends of said pack cloth channels may consist of pockets closed by Velcro, which makes it easy to replace or detach the tubes 36, 38 if needed, e.g. when not flying with a HMG or NVG helmet. The tubes have a smooth transition in the ends to get a smooth sliding surface for the buckle strap 6.

FIG. 5 illustrates the adjustment mechanism (first fixing point) 20 in more detail. A house 40 made of suitable materials as delrin and aluminum is provided with a suitably compression spring 42 loaded slide 44, which locks inelastic cord 32 of the buckle strap 6 in the direction of the tension force F and allows said cord 32 to be displaced in the opposite direction. Hence, tension of the elastic cord 30 of the buckle strap 6 is effectuated by pulling its first end 18 (the free end said inelastic cord 32) in the opposite direction, which causes the slide 44 to compress the spring sufficiently to allow a desired tension of the elastic cord to generate an elastic resistance in the snap hook 8, preferably within an interval of 10-300 N.

When a desired tension has been established and the pulling is ended, by means of the spring load the slide 44 will wedge in the inelastic cord 32 against the wall in said house 40. When it is desired to decrease the elastic resistance in the snap hook 8, a slackening strap 46 is pulled, which is configured to urge the slide 44 against the force of said spring 42 and thereby relieve the tension in the buckle strap 6.

FIG. 6 illustrates the emergency release (second fixing point) 23 in more detail. A jamming cleat 48 of a conventional kind is sewn 50 to the pack cloth 52 at the second fixing point 23. The free end, i.e. the second end 22, of the elastic cord 30 of the buckle strap 6 is formed in a loop and jammed in said jamming cleat when the restraint system 2 is operative. In an event of an emergency situation the pilot can easily doff the helmet by simply pulling 54 the elastic cord 30 free from the jamming cleat and take off the helmet, the elastic cord will follow easily.

The helmet restraint system 2 is intended for widely variable G-loads in an interval from 1-9 G. Experiments have revealed that in order to get a neck muscle force as without helmet in neutral position during a load of 1 G, the elastic resistance in the snap hook typically would be tensed with 11 N. Further, in order to get a neck muscle force as without helmet in neutral position during a load of 9 G, the elastic resistance in the snap hook would typically be tensed with 268 N. Consequently, said restraint system 2 is easily adjustable during flight when changing between missions/maneuvers having different expected G-loads; easily adjustable even by exchanging type of aircraft (Hkp); rapidly adjustable during flight at a sudden alteration in G-load.

It is even possible to configure said restraint system 2 automatically adjustable in dependency of already present systems which respond to variations in G-load.

The invention claimed is:

1. A helmet restraint system for restraining forward and downward movement of a wearer's helmet and head, comprising:
   a buckle strap having a first end and a second end and configured to be movably disposed in a garment of the wearer, the buckle strap being preloaded in said garment between the first end and the second end;
   first attachment means engaged with said helmet and adapted for being associated with said buckle strap; said first attachment means comprising a snap hook with said buckle strap passing movably through said snap hook;

second attachment means engaged with the buckle strap, said second attachment means comprising a first fixing point at a left front side and a second fixing point at a right front side of said garment, wherein the first end of the buckle strap is attached to said first fixing point wherein the second end of the buckle strap is attached to said second fixing point, and wherein the buckle strap is extended in a loop coming out from a first opening and a second opening respectively in a collar of said garment for connection with said first attachment means.

2. The helmet restraint system according to claim 1, wherein the buckle strap comprises elastic cord and at least a portion of the buckle strap adjacent to the first end comprises inelastic cord.

3. The helmet restraint system according to claim 1, further comprising:
a seam interconnecting the elastic cord and the inelastic cord.

4. The helmet restraint system according to claim 1, further comprising:
hollow rigid members mounted in pack cloth channels and extending between the first collar opening and first fixing point and the second collar opening (28) and second fixing point (23) of the garment, wherein the buckle strap is at least partially guided in the hollow rigid members.

5. The helmet restraint system according to claim 1, further comprising:
an adjustment mechanism arranged at the first fixing point for adjusting the tension of the buckle strap at the first end.

6. The helmet restraint system according to claim 1, further comprising:
an emergency release arranged at the second fixing point for releasable fixation of the buckle strap at the second end.

7. The helmet restraint system according to claim 1, wherein the collar of the garment comprises a buoyancy collar of a life vest or flight jacket.

8. The helmet restraint system according to claim 7, wherein the collar comprises a buoyancy collar of a flight jacket and the flight jacket comprises an arm restraint jacket.

9. The helmet restraint system according to claim 1, wherein the garment comprises a harness.

10. The helmet restraint system according to claim 1, wherein the helmet restraint system is adapted for a heavy pilot helmet having an unfavorable center of gravity.

* * * * *